US008883058B2

(12) United States Patent
Cook et al.

(10) Patent No.: US 8,883,058 B2
(45) Date of Patent: *Nov. 11, 2014

(54) METHOD AND APPARATUS FOR MANUFACTURING WATERPROOF FOOTWEAR WITH ATTACHED COMPRESSIBLE LINING

(71) Applicant: Genfoot Inc., Lachine (CA)

(72) Inventors: Gordon Cook, Montreal (CA); Joseph Bichai, Dollard des Ormeaux (CA)

(73) Assignee: Genfoot Inc., Lachine (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/309,276

(22) Filed: Jun. 19, 2014

(65) Prior Publication Data

US 2014/0300032 A1 Oct. 9, 2014

Related U.S. Application Data

(63) Continuation of application No. 14/160,742, filed on Jan. 22, 2014, which is a continuation of application No. 13/750,819, filed on Jan. 25, 2013, now Pat. No. 8,641,953, which is a continuation of application No. 13/527,246, filed on Jun. 19, 2012, now Pat. No. 8,361,369.

(30) Foreign Application Priority Data

Oct. 19, 2011 (CA) ...................... 2755330

(51) Int. Cl.
B29C 45/14 (2006.01)
B29D 35/04 (2010.01)
B29D 35/00 (2010.01)

(52) U.S. Cl.
CPC ............ *B29D 35/04* (2013.01); *B29D 35/0009* (2013.01)

USPC ........... 264/244; 264/266; 264/279; 425/119; 425/129.2

(58) Field of Classification Search
CPC .................. B29D 35/04; B29D 35/02
USPC ............... 264/45.1, 46.4, 244, 261, 263, 266, 264/279; 425/111, 112, 119, 123, 127, 425/129.2

See application file for complete search history.

(56) References Cited

U.S. PATENT DOCUMENTS 2,724,676 A 11/1955 Randall et al.
3,011,187 A 12/1961 Campagna (Continued)

FOREIGN PATENT DOCUMENTS

CA 543581 7/1957
CA 1267259 4/1990

(Continued)

OTHER PUBLICATIONS

Lehar Footwear, Lawreshwar Polymers Ltd., "Process & Technology—EVA Injection Moulded Slippers," Aug. 18, 2011, http://www.leharfootwear.com/manufacturing/htm.

*Primary Examiner* — Jill Heitbrink

(74) *Attorney, Agent, or Firm* — Oppedahl Patent Law Firm LLC

(57) ABSTRACT

A method and apparatus for making a lined waterproof footwear product, and footwear product formed therefrom, are provided. A last, having an exterior surface configured to correspond to the size and shape of the interior surface of the footwear product, is covered with a microcellular lining material. An injection mold comprises shells having a predetermined configuration to mold an upper portion that attaches to the lining during the molding process. In the finished footwear product, the molded upper portion has a molded foot portion that extends around the wearer's foot and an upwardly-extending molded portion that covers a part of the lining while leaving another part of the lining uncovered.

6 Claims, 3 Drawing Sheets

(56) References Cited

U.S. PATENT DOCUMENTS

| | | | |
|---|---|---|---|
| 3,429,007 A * | 2/1969 | Aoki | 425/119 |
| 3,950,483 A * | 4/1976 | Spier | 264/241 |
| 4,016,661 A | 4/1977 | Tibbitts | |
| 4,188,680 A | 2/1980 | Adams | |
| 4,453,904 A | 6/1984 | Koliwer | |
| 4,899,465 A | 2/1990 | Bleimhofer et al. | |
| 5,505,011 A | 4/1996 | Bleimhofer | |
| 5,595,518 A | 1/1997 | Ours | |
| 5,647,150 A * | 7/1997 | Romanato et al. | 36/117.1 |
| 5,667,737 A * | 9/1997 | Wittmann | 264/40.1 |
| 6,855,281 B2 * | 2/2005 | Gumringer et al. | 264/132 |
| 8,361,369 B1 * | 1/2013 | Cook et al. | 264/244 |
| 8,641,953 B2 * | 2/2014 | Cook et al. | 264/244 |
| 2003/0015822 A1 | 1/2003 | Rinehart, Jr. et al. | |
| 2004/0020077 A1 * | 2/2004 | Thomas et al. | 36/4 |
| 2005/0144034 A1 | 6/2005 | Hunter | |
| 2013/0133226 A1 | 5/2013 | Buzon | |
| 2013/0133229 A1 | 5/2013 | Ludemann | |

FOREIGN PATENT DOCUMENTS

| | | |
|---|---|---|
| CA | 1306107 | 8/1992 |
| CA | 2328530 | 6/2001 |
| GB | 369315 | 3/1932 |
| GB | 758777 | 10/1956 |
| GB | 763743 | 12/1956 |
| GB | 1420311 A | 1/1976 |
| GB | 2146282 A | 4/1985 |
| GB | 2188863 A | 10/1987 |
| WO | 95/24305 A1 | 9/1995 |
| WO | 97/20671 A1 | 6/1997 |
| WO | 2004/039197 A1 | 5/2004 |

* cited by examiner

METHOD AND APPARATUS FOR MANUFACTURING WATERPROOF FOOTWEAR WITH ATTACHED COMPRESSIBLE LINING

FIELD OF THE INVENTION

The invention is in the field of footwear and, in particular, pertains to an improved method and apparatus for making waterproof footwear with lining, such as an insulation-type lining in the case of winter footwear, and waterproof footwear formed thereby.

BACKGROUND

Different manufacturing methods are known for making lined (e.g. insulated) waterproof footwear (e.g. winter boots). These include the conventional lasted process, a process for injection molding the main boot and then inserting into it a loose insulating liner, and, for rubber boots, a vulcanization process applied to a lining layer. Each of these known methods involves numerous separate steps which increases costs and impedes efficiency.

The lasted process is an old, well-known method which uses a last having the shape of the intended boot, the last being a three dimensional model for the intended boot. By this method, the boot materials are formed and fitted onto the last. Hiking boots are typically made in this manner. The selected materials, which may be leather and/or fabrics, including material for a lining layer, are cut into pieces using the last as a model, assembled with a waterproof membrane layer, for example a Gore-Tex membrane, sewn together and then cemented to a rubber sole.

The vulcanization process is also a well-known method for making rubber boots and uses a last. By this method, a lining material is formed to fit over a last and positioned to cover the last. Unvulcanized (i.e. raw) rubber is cut into pieces according to a pattern and the pieces are laid over and cemented to the lining material covering the last. After the positioning of the pieces has been completed, the assembly is put into a heated oven and subjected to heavy pressure which causes the raw rubber to vulcanize and adhere to the insulating microcellular lining.

These known methods involve many separate steps or entail multiple sub-processes which increase production costs. Therefore, a simpler method would constitute a desirable improvement.

SUMMARY OF THE INVENTION

In accordance with the present invention there is provided a method for making a lined waterproof footwear product. A last has an exterior surface configured to correspond to the size and shape of the interior surface of the footwear product. At least a portion of the exterior surface of the last is covered with a microcellular lining material. A first mold is provided for injection molding the footwear product whereby the first mold comprises first and second plates, and first and second shells wherein each shell has a pre-determined configuration to cooperate with the exterior surface of the lining covered last to form: (i) a pre-injection cavity between the shells and the lining covered last when the lining covered last is located between the first and second shells, and between the first and second plates located on opposite sides of the shells, and the plates are closed in position for injection molding; and, (ii) an injection cavity, defining the configuration of the footwear product, between the shells and the lining covered last when the plates have been tightly closed, the lining covered last is between the closed plates and injection material is being injected into the injection cavity whereby the injection pressure causes the microcellular lining material to compress and thereby reconfigure from the pre-injection cavity to the injection cavity. The lining covered last is located between the first and second shells, and between the first and second plates located on opposite sides of the shells. The plates are closed in position for injection molding, thereby forming the pre-injection cavity between the shells and the lining covered last. An injection material is injected under pressure into the pre-injection cavity whereby the pre-injection cavity is reconfigured to the injection cavity, and injecting the injection material until the injection cavity is filled with the injection material. The injection material is hardened in the injection cavity whereby the hardened injection material attaches to the microcellular lining material and forms the footwear product over the last. The first mold is opened to separate the plates and shells and expose the finished footwear product and removing the footwear product from the last.

The injection material may be a thermoplastic material which is heated prior to the injecting step, is molten when injected, and is hardened by cooling. Preferably, the last is comprised of a hard, durable material selected from a group consisting of hardened aluminum, steel and stainless steel. The covering of the last may comprise positioning a sock lining over the last.

The footwear product may be an upper part of another footwear product, with a sole made by injection molding by a second mold comprising first and second sole plates and first and second sole shells. The sole formed in a sole cavity between the first and second sole shells by injecting injection material into the sole cavity, and attached to the upper to form the other footwear product. The sole may be attached to the upper by injection material during the injection molding and cooling of the upper. A second sole may be injection molded concurrently with the injection molding of the upper. Preferably, an injection port is located on the outside of the first mold.

The invention further provides apparatus for making a lined waterproof footwear product, wherein a last has an exterior surface configured to correspond to the size and shape of the interior surface of the footwear product. A first mold is provided for injection molding the footwear product whereby the first mold comprises first and second plates, and first and second shells wherein each shell has a pre-determined configuration to cooperate with an exterior surface of a lining covered last to form: (i) a pre-injection cavity between the shells and the lining covered last when the lining covered last is located between the first and second shells, and between the first and second plates located on opposite sides of the shells, and the plates are closed in position for injection molding; and, (ii) an injection cavity between the shells and the lining covered last when the plates have been tightly closed, the lining covered last is between the closed plates and injection material is being injected into the injection cavity whereby the injection pressure causes the microcellular lining material to compress and thereby reconfigure from the pre-injection cavity to the injection cavity; whereby the lining covered last comprises the last with at least a portion of the exterior surface of the last covered with a microcellular lining material and, the configuration of the injection cavity defines the configuration of the footwear product.

Using the apparatus, the footwear product is formed by injecting under pressure into the pre-injection cavity an injection material thereby causing the pre-injection cavity to reconfigure to the injection cavity, until the injection cavity is filled with the injection material, and hardening the injection material in the injection cavity. The footwear product may be an upper part of another footwear product, with the apparatus further providing a second mold, comprising first and second sole plates and first and second sole shells for injection molding a sole for attachment to the upper. Preferably, an injection port is located on the outside of the first mold.

The invention further provides a footwear product or upper and other footwear product made by the foregoing steps.

BRIEF DESCRIPTION OF THE DRAWINGS

The invention is described in detail below with reference to the following drawings.

DETAILED DESCRIPTION

Figure 1:
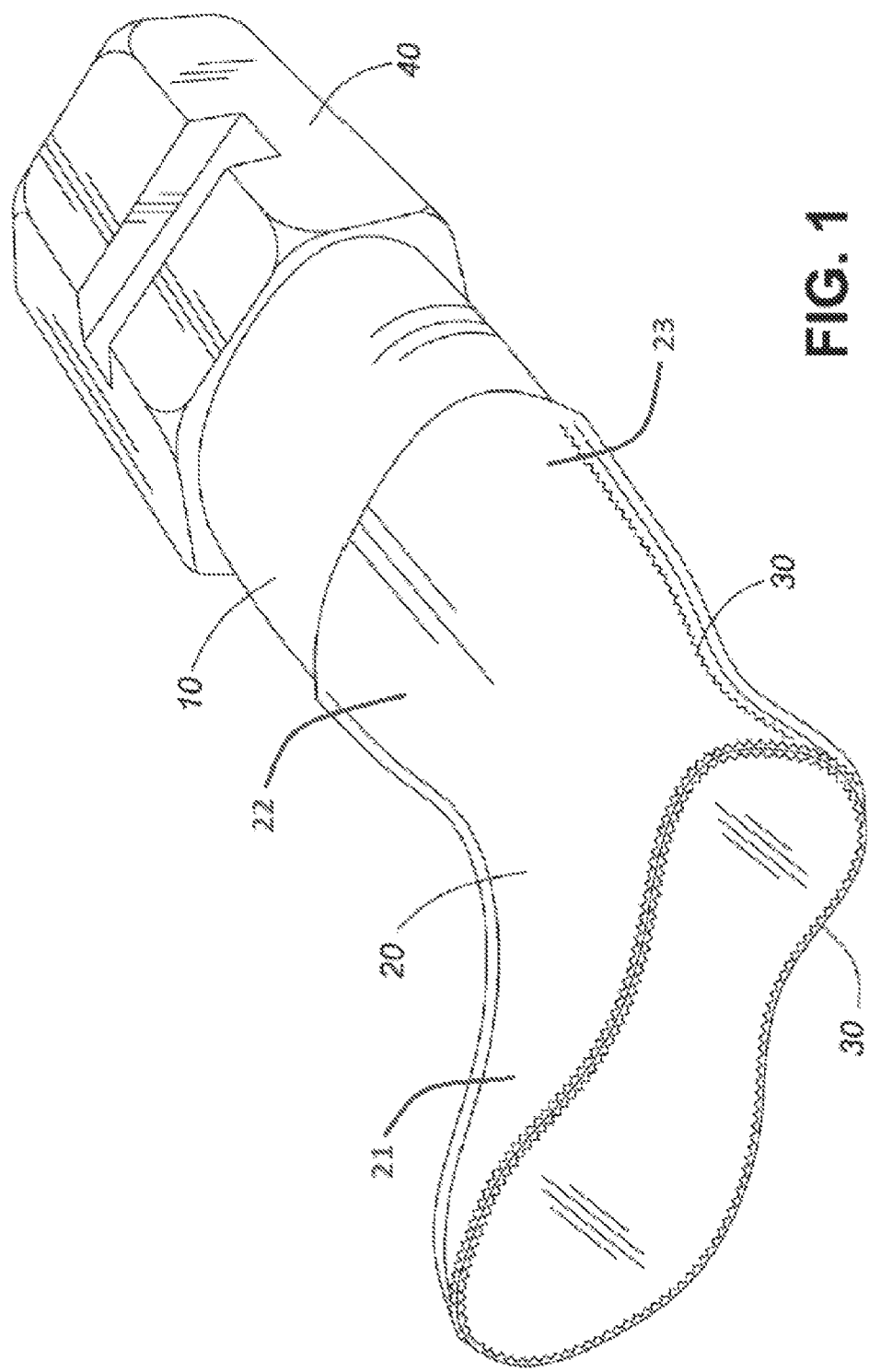
FIG. 1 is a perspective view illustrating a layer of lining material positioned over and covering a last in accordance with the invention.
Figure 2:
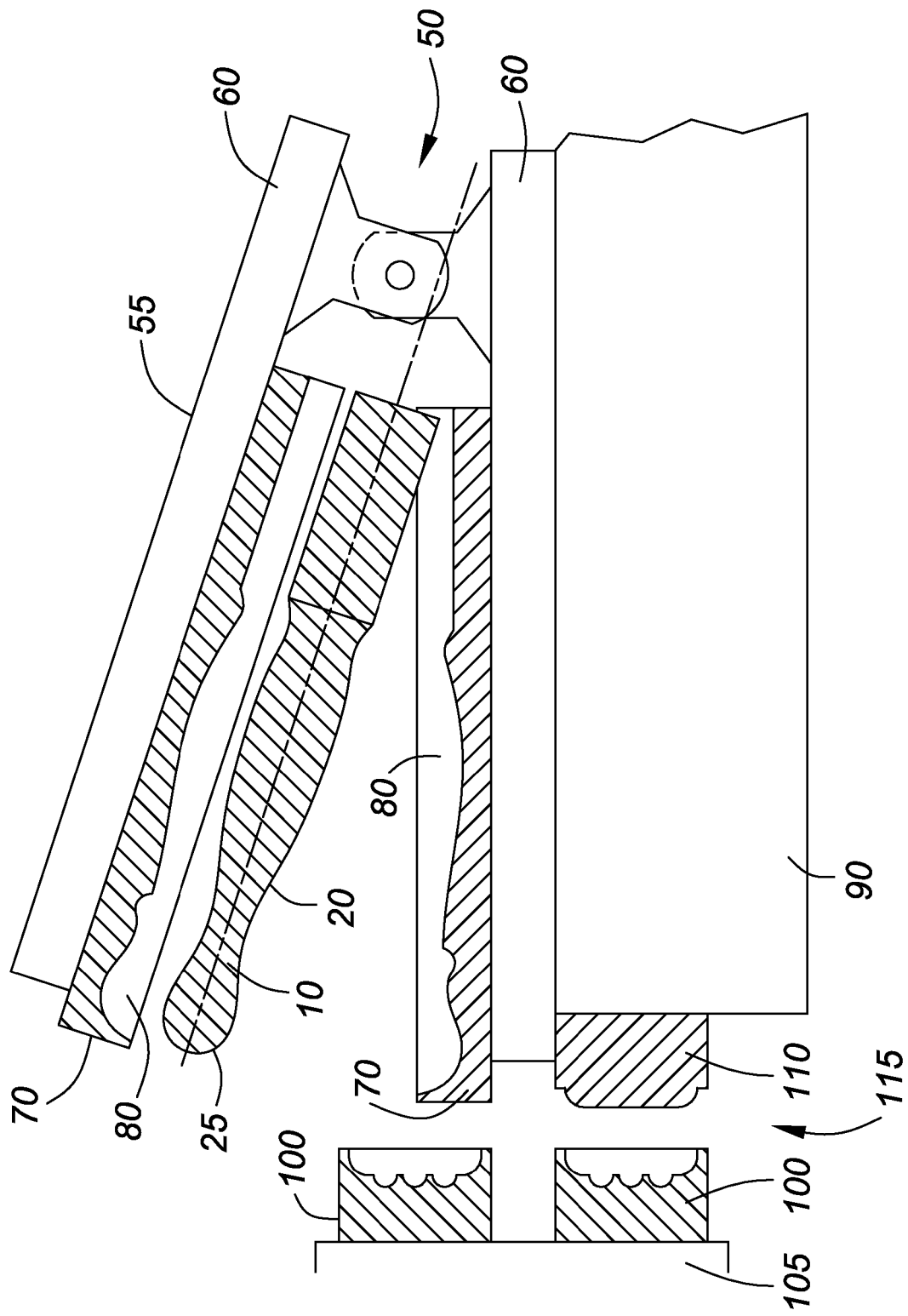
FIG. 2 is a sectional plan view of an injection molding machine in accordance with the invention for making a lined, waterproof boot, having an upper mold and two sole molds for cyclically injecting, in each cycle, both a boot upper and a sole and attaching a previously molded sole to the boot upper that is molded during the cycle. A last covered with a sock lining is shown in position between two boot upper mold plates and shells, ready to close the plates around the last and cover the end of the plates with a sole plate containing a previously injection-molded sole. Also shown is a second sole plate that is coupled to the sole plate covering the boot upper mold by a rotatable plate, whereby the second sole plate is closed onto a cover plate when the upper mold is closed and injected with injection material to form a sole during the same injection cycle of injection-molding the boot upper.

The subject invention provides an improved method and apparatus for making lined waterproof footwear, and waterproof footwear formed thereby. The method uses an injection molding process and a last. A predetermined thermoplastic material is selected as appropriate for the application and used as the injection material. As illustrated by FIGS. 1 and 2, a last 10 is advantageously used within the injection mold 55 for the upper of the footwear product to position and attach to the upper 130 a lining 20. The upper mold 55 comprises two shells 70 and two plates 60. The shells 70 are designed to complement both the configuration of the layer of lining 20 and the dynamic changes the lining configuration undergoes from the pressure applied to it during the course of the injection process so as to create a cavity 80 having a predetermined configuration of the upper 130 of the footwear product (see FIG. 3) to be made by the mold.

Figure 3:
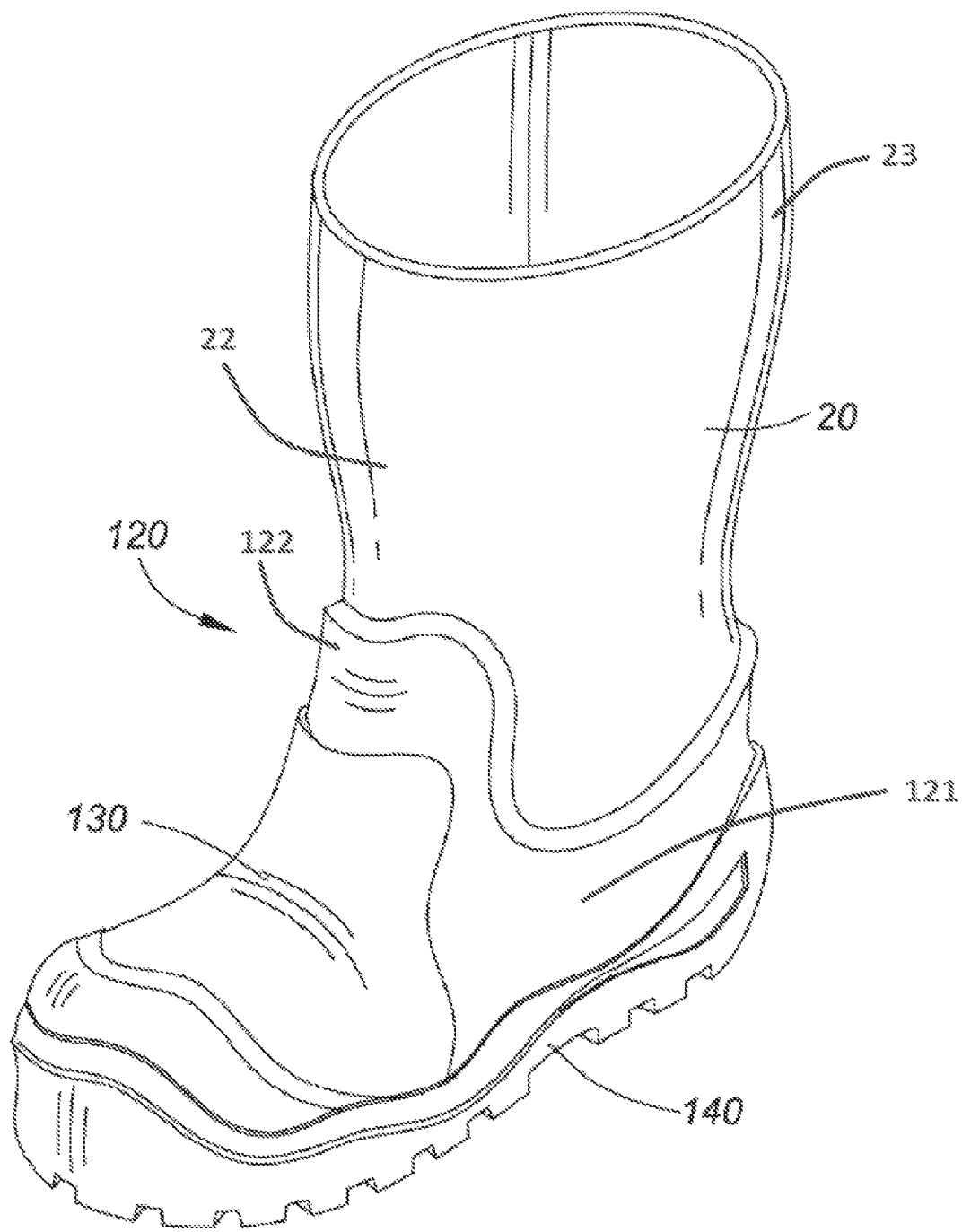
FIG. 3 is a perspective view of a waterproof boot having an interior attached lining made in accordance with the invention.

The thermoplastic material, in a fluid state, is injected over the last 10 covered with a lining material (also referred to herein as a sock lining) 20 while the last 10 is located within the upper mold 55 and allowed to set (i.e. harden) within the mold to form a lined waterproof footwear product 120 as illustrated by FIG. 3. While in its fluid state after being injected into the upper mold 55, the thermoplastic material covers the sock lining 20 and attaches to the sock lining 20 as it sets. For the exemplary, illustrated embodiment a winter boot is provided; however, it is to be understood that the invention is not limited to any particular type of boot and also provides other types of lined waterproof footwear including rain boots and shoes.

As illustrated by FIG. 1, the last 10 functions as a three dimensional model or pattern which is used to size and fit the sock lining 20. The last 10 is made of a hard metal, usually of hardened aluminum or steel for high durability. The exterior surface of the last 10 is configured to mirror (i.e. correspond to) the size and shape of the interior surface of the item of footwear that is to be made by the upper mold 55. A predetermined relatively thick, microcellular lining material is sized, cut and sewn to match the size, shape and configuration of the exterior surface of the last 10 and fit tightly over the last 10 to form the sock lining 20. The sock lining 20 may, for example, be chosen to provide insulation to a winter boot such as that shown by FIG. 3. When the lining pieces have been sewn together 30, the resulting sock lining 20 is positioned over the last 10 to cover it as shown in FIGS. 1 and 2.

As can be seen in the example illustrated in FIG. 1, the lining 20 has a foot portion 21 adapted to cover a wearer's foot and a leg portion 22 adapted to extend up a part of the wearer's leg. The leg portion 22 of the lining 20 has a widened area 23 for receiving the wearer's calf. This widened area 23 is also shown in FIG. 3.

By "microcellular" it is meant that the material is comprised of a large number of cells and having a compression—expansion property so that the lining material is caused to compress during the process of injecting the injection material into the mold cavity, under pressure, and then expand after the molded boot has been removed from the mold and taken off the last.

In the example of the illustrated embodiment a neoprene microcellular material manufactured by Nam Liong Enterprises Co. Ltd. of Tainan, Taiwan, grade WS-2H comprising 30% polychloroprene rubber and 70% styrene butadiene rubber, is selected for use for the lining material. This is a foamed synthetic rubber product (i.e. containing gas cells) and is selected for the illustrated application of a winter boot because of its relatively good insulation characteristic. Examples of other suitable microcellular materials are foam blends such as polyurethane or EVA (ethylene vinyl acetate)—based blends. For the illustrated example, the selected lining material has a relatively large thickness of 3 mm but it will be understood by the skilled reader that the thickness to be chosen will vary from application to application according to design choices for the particular footwear product to be formed and the particular mold materials to be used.

To mold the boot upper 130, the last 10 with sock lining 20 is attached to the upper mold 55 using the last holder 40 whereby it is positioned in the cavity 80 between the two sets of plates 60 and shells 70 of the upper mold 55 as illustrated by FIG. 2. The plates 60 and shells 70 are comprised of a hard metal such has hardened aluminum or steel for high durability. The shells 70 are precision measured to take into consideration the thickness of the sock lining 20 when it is compressed during the injection molding process. A key criteria for the design of the upper mold 55 is to provide a cavity 80, referred to as the pre-injection cavity, between the interior surfaces of the mold 55 and the sock lining 20 having a configuration which accounts for a non-uniform compression of the sock lining 20 when it is, subsequently, subjected to pressure from an injection of thermoplastic material into the cavity 80. This is because it is the final configuration of the cavity, referred to as the injection cavity, after the injection of the thermoplastic material with its attendant pressure applied to the sock lining 20, that becomes occupied by thermoplastic material and defines the configuration of the footwear product made by the process. Therefore, the upper mold 55, the sock lining 20 and the cavity 80 together must be designed to account for a non-uniform compression factor of the sock lining 20 over the area of the sock lining 20. Thus, the combination of the last 10 with sock lining 20 in position with the mold shells 70 and plates 60 closed there over, together operate in a novel manner to form the cavity that is required to make the intended item of footwear in like manner to a conventional mold core having no lining material.

For the injection process, the plates 60, 105 of the upper and sole molds 55, 115 are tightly closed and sealed whereby the last 10 with sock lining 20 is positioned between upper plates 60 and shells 70 to form an upper cavity 80 into which the molten thermoplastic injection material is injected in conventional manner by the injection molding machine 50. As is the case for the conventional injection molding process, the upper mold 55 includes two shells 70 and two plates 60 which, when closed, provide the upper cavity 80 into which heated, molten injection material is injected under pressure. The mold 55 also includes a channel (not illustrated) extending from an opening to the cavity 80 for passage of the pressure-injected injection material into the cavity 80 to completely fill it, whereby the thermoplastic material adheres to the sock lining 20.

For the illustrated embodiment, the sole 140 of the footwear product is also injection molded by the injection molding machine 50 during the same injection cycle. The sole mold 115 includes a shell 100 and two plates 105, 110 as shown in FIG. 2. To provide processing efficiency, the illustrated exemplary injection molding machine 50 includes two sole mold shells 100 which are both attached to a rotatable plate 105. After each injection cycle of the injection molding machine 50 the plate 105 is rotated 180 degrees whereby an empty shell 100 is positioned opposite a cover plate 110 attached to a table 90 of the injection molding machine and the other shell 100, for which a sole injection has just been completed, is moved away from the cover plate 110 and in-line with the upper mold 70. This enables the injection molding machine 50 to mold both a boot upper 130 and a boot sole 140 during one injection cycle and attach to a boot upper 130 molded during the same injection cycle a boot sole 140 that was molded during the previous cycle. Since the liquid injection material would flow between sole and upper if both were to be molded and attached at the same time, a previously molded sole is attached to an upper during the molding of the upper, and another sole is molded at the same time so it is ready for attachment to the next-molded upper.

With reference to FIG. 2, when the upper plates 60 are closed the sole shell 100 opposite the cover plate 110 is tightly closed onto the cover plate 110 to form a cavity (not illustrated) between them into which an injection material for the sole is injected during the same injection cycle that the upper cavity 80 is injected with the injection material for the upper. At the same time, the other sole shell 100, which is filled with a molded sole made during the previous injection cycle, is tightly closed onto the end of the upper mold 55 in-line with the bottom of the sock lining 20. That previously made molded sole attaches to the upper while the upper is molded.

After injection of the thermoplastic material into the upper cavity 80 and sole cavity formed between the sole shell 100 and cover plate 110, it is cooled and hardens, thereby forming the molded boot. When sufficiently cooled, the plates 60, 105, 110 of the molds are opened (separated) and an operator of the injection molding machine 50 removes the finished waterproof boot having an attached lining 120 from the last 10 while the last holder 40 remains attached to the upper mold 55.

The upper mold 55 is designed to provide full coverage of the injection material into the cavity 80. To do so, the design is crafted to take into consideration the non-uniform reaction of the microcellular material of the sock lining 20 as and when it is exposed to high pressure, high temperature and high stress during the injection molding process. For example, the exemplary 3 mm thick sock lining 20 will compress 0.075 mm more at the edges, where the mold closes, than in the middle of the mold. The surfaces of the shells 70 are designed to account for the dynamic compression changes which the sock lining 20 will undergo during the injection molding process, by allowing more (or less) space to form for the cavity 80 in relation to the compression factor of the sock lining 20 at the adjacent surfaces of the shells 70.

Injection ports of the mold (not illustrated) are provided for the passage of the molten injection material from an injector (not illustrated) of the injection molding machine 50. For the illustrated embodiment, the injection ports are unconventionally placed on the outside of an upper shell 70, rather than being hidden on the sole mold 115 as in the conventional injection molding process, to allow for a better flow of the injection material and filling of the upper mold cavity 80. If, instead, the upper mold 55 is injected in conventional manner, the top of the toe area of the boot will have a joint line and, depending upon the application, this may not be desirable for aesthetic reasons. It may also decrease durability because a joint line may be more prone to crack when the boot is worn.

As for conventional molds, the particular positioning and configuration (i.e. size and shape) to be selected for the injection ports also affects the timing of the contact of the injection material with the sock lining. If there is insufficient spacing for the injection material to flow and reach the extremities of the cavity, within seconds at the very high pressures and temperatures applied by the injection molding process, the injection material will become obstructed and the delay in flow will cause it to harden too early, not fill the cavity and clog the injector of the injection molding machine. Also, the upper mold 55 is designed so as to produce no overspill of the injection material which occurs when the edges of the mold plates are not sufficiently sealed together after the mold is closed.

FIG. 3 is a perspective view of a waterproof footwear product 120 in the form of a boot made in accordance with the invention. The boot comprises a molded upper portion 120 attached to the lining 20 and a boot sole 140. As can be seen in FIG. 3, the molded upper portion 120 has a molded foot portion 121 adapted to extend completely around the wearer's foot and to cover the lining's foot portion 21 (shown in FIG. 1, but not visible in FIG. 3). The molded upper portion 120 also has an upwardly-extending molded portion 122 adapted to extend upward from the molded foot portion 121. As can also be seen in FIG. 3, the upwardly-extending molded portion 122 covers a part of the leg portion 21 of the lining 20 while leaving another part of the leg portion 21 of the lining 20 uncovered.

The details of the illustrated embodiment may be varied as considered expedient to a person skilled in the art and are not to be considered essential to the invention by reason only of inclusion in the preferred embodiment. Rather, the invention is defined by the appended claims.

What is claimed is:

1. A method for making an injection molded waterproof boot comprising a molded upper portion and a compressible lining material attached thereto whereby the compressible lining material becomes attached to the molded upper portion during injection molding of the upper portion, the method comprising:

(a) providing a last having an exterior surface which corresponds to an interior surface of the boot;
(b) covering at least a portion of the exterior surface of the last with a compressible microcellular lining material which compresses under pressure, the lining material having a foot portion adapted to cover a wearer's foot, and a leg portion adapted to extend up a part of the wearer's leg, with a widened area for receiving the wearer's calf;
(c) providing an upper mold configured for injection of a flowable injection material into an injection cavity to form the upper portion wherein the upper mold comprises first and second shells, each said shell having a pre-determined configuration, wherein
the upper mold is designed to form the molded upper portion in a desired shape such that, in the boot, the molded upper portion has a molded foot portion adapted to extend completely around the wearer's foot and to cover the foot portion of the lining, and an upwardly-extending molded portion adapted to extend upward from the molded foot portion and to cover a part of the leg portion of the lining while leaving another part of the leg portion of the lining uncovered; and
the pre-determined configuration of each said shell is designed to account for a dynamic non-uniform compression of the lining material during the injection molding, the pre-determined configuration of the shells designed to form:
(i) prior to the injection molding, a pre-injection cavity between the shells and the lining material covered last when the lining material covered last is located in the mold between the first and second shells, and with the shells in a closed position for injection molding; and
(ii) when the lining material covered last is located in the mold with the shells in a closed position and the injection material is being injected, a dynamically formed injection cavity between the shells and the lining material covered last wherein the configuration of the injection cavity is dynamically formed by pressure applied during the injection of the injection material which causes the lining material to compress and thereby reconfigure the pre-injection cavity to form the injection cavity;
(d) locating the lining material covered last between the first and second shells, closing the first and second shells in position for injection molding, the pre-injection cavity formed between the shells and the lining material covered last, and closing a sole shell containing a boot sole onto the ends of the first and second shells in line with the bottom of the lining material;
(e) injecting the flowable injection material into the pre-injection cavity between the shells and the lining material covered last to form and fill the injection cavity with injection material;
(f) hardening the injected injection material, whereby the hardened injection material attaches to the lining material and the boot sole, the hardened injection material forming the molded upper portion, wherein the molded upper portion, the attached lining material, and the attached boot sole together form the boot;
(g) opening the mold to expose the boot; and
(h) removing the boot from the last.

2. The method according to claim 1 wherein the boot is a winter boot.

3. The method according to claim 1 wherein the boot is a rain boot.

4. The method according to claim 1 wherein the step of injecting the flowable injection material comprises injecting the flowable injection material through an injection port on the upper mold.

5. The method according to claim 1 wherein the step of injecting the flowable injection material comprises injecting the flowable injection material through an injection port on the upper mold and not through the sole shell.

6. The method according to claim 1 wherein the step of injecting the flowable injection material consists of injecting the flowable injection material through the upper mold.

* * * * *